Oct. 3, 1939.  F. Y. CHUCK  2,174,734
METHOD OF MANUFACTURE OF LACTOSE CONTAINING MATERIALS
Filed April 19, 1937  2 Sheets-Sheet 1
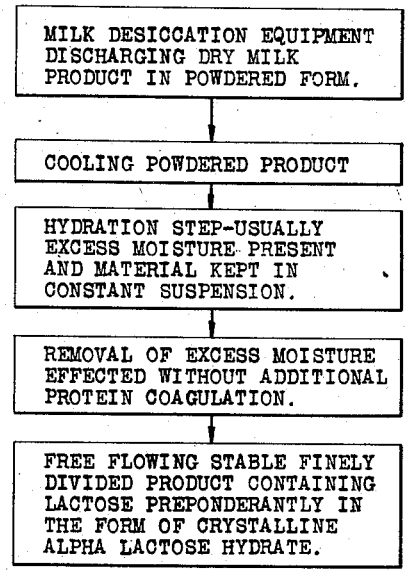
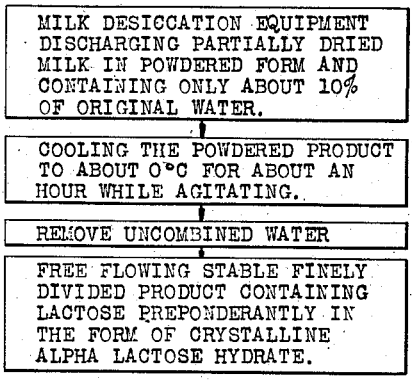
INVENTOR.
FAW YAP CHUCK
BY Robert H. Eckhoff
ATTORNEY.

Patented Oct. 3, 1939

2,174,734

UNITED STATES PATENT OFFICE 2,174,734

METHOD OF MANUFACTURE OF LACTOSE CONTAINING MATERIALS

Faw Yap Chuck, San Francisco, Calif.

Application April 19, 1937, Serial No. 137,870

7 Claims. (Cl. 99—56)

This invention relates generally to the manufacture of products from fluid materials containing such quantities of milk sugar or lactose that desiccation thereof results in products that are markedly hygroscopic, as for example ordinary milk whey. This is a continuation in part of my application Serial Number 47,242, filed October 29, 1935.

It has been heretofore appreciated that milk and like materials can be dehydrated to form a dry powder, particularly in the ordinary spray type desiccator. The product secured, however, is markedly hygroscopic, and considerable prior art has been developed dealing with stabilization of this product to the end that the desiccated material be stabilized so the material is free flowing. For example, Peebles and Manning, in Patent No. 1,928,135, of September 26, 1933, point out that a mass of this desiccated material left exposed to the atmosphere rapidly absorbs moisture and in time is converted into a solid cake. It is therefore impractical to store or ship the material except in expensive lined cartons or containers. These really offer little solution to the problem, inasmuch as once such a container is opened all of the product must be used immediately or else the moisture in the atmosphere will cause that remaining to solidify.

While the prior art has attempted to hydrate these milk products and to stabilize them so that they remain free flowing with a high water soluble content, this result has not been achieved. For example, Eldredge, in Patent No. 1,923,427, attempts stabilization by mixing of the anhydrous material with water in a mixer, forming a cake and then grinding the cake. The finely divided material thus secured will not remain totally free flowing but some of it will recake and pass into the solid form in a matter of a few days. This material will have a high insoluble protein content, will be off-color, and have a cheesy taste.

The product achieved by the aforementioned Peebles and Manning patent is particularly characterized by its high protein insoluble content, a cheesy taste and a brownish color. In addition, the product obtained by the process in that patent did not remain free flowing upon standing, but after a time solidified so that regrinding was necessary. The product thus secured, because of the aforementioned insolubility characteristics, the cheesy taste and color, was only suitable for stock feed.

In accordance with this invention I am enabled to provide a process by which the various dried milk products containing substantial percentages of lactose anhydrides can be stabilized without sacrificing water solubility, color and taste, and it is in general the broad object of the present invention to provide a process for the hydration of these hygroscopic materials.

I have found that the hydration of the dried milk products must be carried on in a particular manner. Thus it is desirable that the required amount of moisture be introduced under such conditions that local over-concentrations of moisture on milk particles is avoided to prevent the formation of lumps and semi-solid pasty masses. I have further found that the dried milk product should be hydrated under such conditions that the preponderant lactose content is present in the form of the alpha lactose hydrate. With this material present in a preponderant amount, the material remains free flowing even though it is subjected to atmospheres containing considerable proportions of moisture, which atmospheres, on any of the products of the prior art, would result in caking of the product.

While the prior art considers that the hydration reactions, alpha lactose anhydride to alpha lactose hydrate, and beta lactose anhydride to beta lactose hydrate, went practically instantaneously, I have determined that these reactions go much slower in the presence of protein and protein mixtures as in milk powder. This, I have determined, permits concentrations of moisture to occur on protein micellae and the protein particles are swollen in accordance with the Donnan phenomena because of this concentration of moisture on the protein micellae.

In accordance with my invention I maintain the hydration condition such that the transition from the anhydrous to the hydrated form takes place in such a manner that concentration of moisture on the protein micellae is prevented. At the same time, I maintain conditions such that the formation of alpha lactose hydrate is favored, particularly a crystalline form thereof. As a matter of fact, I prefer that the hydration be forced in the direction of alpha lactose hydrate as much as possible, inasmuch as I have determined that with this material present in a preponderant amount the dried hydrated milk product will remain free flowing. In this respect, as well as in numerous others, the process and product of this invention can be readily distinguished from that of my prior Patent No. 2,016,592 of October 8, 1935. The process therein disclosed produced a product containing lactose largely in the beta form, while the protein soluble portion was reduced. In the process of this invention the product contains lactose preponderantly in the alpha form without any substantial reduction in the protein soluble content.

The product of this invention is characterized by the lactose being largely in the alpha form, crystalline, more free flowing than the product of my patent, and without any reduction substantially in the water soluble protein content. This invention is further characterized by the fact that I have now discovered, namely, beta lactose, in the presence of a soluble protein, as lacteal albumen, crystallizes only wih difficulty and that to secure crystallization of beta lactose one must heat the lacteal material to such a temperature and to such an extent that reversion to the anhydrous form occurs. While the free flowing material of this invention is not as sweet in its dry powdered form as that of my patent, because of the low beta and high alpha lactose contents, this is really immaterial, for in use, upon heating to 93.5° C. or above in the presence of water, the alpha is converted to the sweet beta lactose. The dry power containing alpha lactose is not used as a food in the form of a dry powder, but is usually mixed with water and heated.

Heretofore the presence of any considerable amount of alpha lactose in the milk product has been avoided, because it was considered as making the product too water insoluble. This I believe is erroneous, for alpha lactose is nearly as water soluble as the beta. In a milk product the difference in solubility between alpha and beta lactose hydrate is not sufficient to affect the commercial grading of the product, but the decrease in solubility of the protein particles after stabilization by prior art methods does materially lower the commercial value of the product.

The products stabilized by the prior art processes have all been open to the objection that they included a cheesy flavor and odor, and were often dark in color. I have determined that these objections are due to the presence of fermentation products, and, further, that the formation of these products is accelerated by the heat generated during hydration of the lactose anhydride.

It is in general another broad object of the present invention to provide for the stabilization of dry milk products containing a considerable percentage of lactose anhydride and of hydrating these materials under such condition that alpha lactose hydrate is formed in the preponderant amount in the product.

Another object of the invention is to provide a process favoring the formation of alpha lactose hydrate in a material containing a sufficient quantity thereof to be markedly hygroscopic.

Another object of the present invention is to provide a process for the manufacture of a stabilized material including initially sufficient quantities of lactose anhydrides as to be markedly hygroscopic.

Another object of the present invention is to provide a new milk product in which alpha lactose hydrate is present in a preponderant amount, in a crystalline form, and which product is further characterized by its high water solubility, its free flowing quality, as well as the absence of any cheesy flavor or dark color.

Another object of the present invention is to provide a product which remains free flowing even though the product is finely divided, and even though initially the product was markedly hygroscopic because of the presence of lactose anhydrides.

The invention includes other objects and features of advantage, some of which, together with the foregoing, will appear hereinafter, wherein a present preferred manner of practicing the invention has been set forth.

Figs. 1 and 2 are diagrammatic representations of certain steps in the process.

Figure 3:
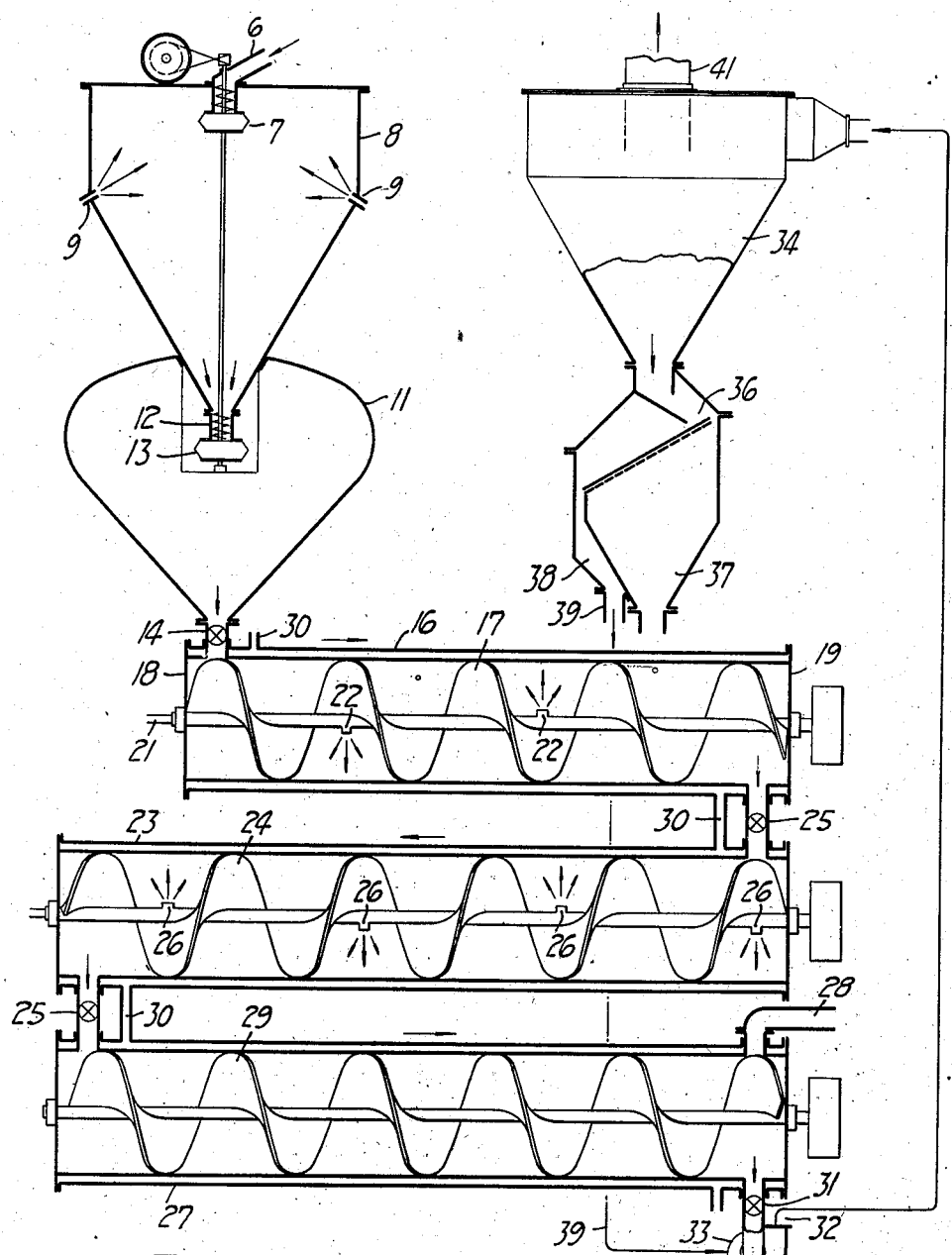
Figure 3 is a diagrammatic view illustrating the system or arrangement of apparatus which can be employed to carry out the process and to manufacture the product thereof.

The invention can be briefly summarized by stating that what is sought is a product containing as little water insoluble protein as is possible and as high an alpha lactose content. The process for producing this material should not increase the protein insoluble portion, for this is undesirable commercially. At the same time, the processes should force the production of alpha lactose, and I have found that processes forcing the following reactions to alpha lactose do not increase substantially the insoluble protein content.

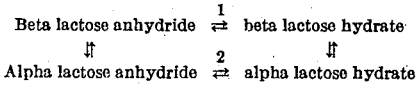

The process hereinafter disclosed is one giving a product within this invention. However, it is to be understood that this process is set forth by way of example, and not by way of limitation for other processes can be used and variations can be made in the individual steps disclosed.

The present invention contemplates hydration of alpha lactose anhydride as well as conversion of beta lactose to the alpha form. Thus the present invention contemplates maintenance of conditions such that the equilibrium reaction:

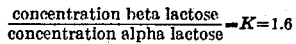

is constantly affected by a removal of alpha lactose by crystallization.

The preferred method can probably be best understood by describing it in conjunction with the apparatus shown in the drawings. The material to be treated is introduced in finely divided dry form through screw feeder 6. This material can be produced in any desired manner and the present invention is pertinent to the hydration thereof so long as the material includes such a percentage of lactose anhydrides as to be markedly hygroscopic. Thus the invention is applicable to dry whole milk, dry skimmed milk, dry buttermilk, dry whey or the like.

Of course, the previous history of the material is important for a dry product having a high protein insoluble portion, as the product of the roller process, retains its initial insoluble portion after stabilization. It is therefore important that the initial protein insoluble portion be as low as possible and that a process suitable for production of a dry product of high solubility be used. At the present time, materials of high solubility are produced by spray drying and such a process is suitable although this invention is not concerned with production of the milk product but stabilization thereof without decreasing the solubility.

The product to be stabilized is, of course, derived from a previous desiccation or drying step. In accordance with this invention I cool the product, if it is not cold, prior to stabilization thereof. I have found that by first cooling, preferably to room temperature (20° C.) and below, caking of the material is avoided. Preferably I cool to close to 0° C., if not actually to this temperature. These steps are respectively indicated as the first two steps in Figure 1. Of course, if the product available for stabilization is cold, then a cooling step is not necessary.

I have found that with a cold product I can add moisture and so avoid caking of the material. There is apparently a critical percentage of moisture above which the material is very powdery, and below which it tends to cake. This varies for each product, but I have found it to be below about 10%. If we add 10% by weight of water, the product is powdery and remains so during the hydration step. Hydration can then be effected easily, surely, and without caking.

The moisture to be added is in excess of that required to hydrate the lactose. Removal of this excess is necessary before the material has settled for any considerable length of time, for otherwise the material, with the excess moisture present, will cake due to swelling of the protein content. The dehydration step will be discussed hereinafter. The hydration and dehydration steps are the third and fourth steps in the diagram of Figure 1.

The cold material to be stabilized by hydration is discharged through the screw feeder 6 (Figure 2) into a rapidly revolving basket 7 which distributes the finely divided material in a powder spray in hydration vessel 8. Moisture is placed in this vessel by discharging water under pressure through spray nozzles 9. The rate of material addition and the quantity of water sprayed are correlated so that about 60% of the required amount of moisture, on a weight basis, is added to the material while the latter is passing through hydration chamber 8.

The hydration chamber 8 is positioned above and in communication with a mixing chamber 11 into which material is discharged by screw feeder 12 and revolving basket 13. The material is now partially hydrated and any tendency for lump formation or for water concentration to occur on any protein micellae is avoided by discharge from the rapidly revolving basket 13 and the mechanical disintegration which will occur in its handling. It is to be noted that material is removed from the hydration vessel 8 as fast as its forms, since conveyor 12 has a higher capacity than screw conveyor 6. This prevents the formation of any cake in hydration vessel 8.

To facilitate and assist the transformation from beta lactose hydrate to alpha lactose hydrate, I preferably, though not necessarily, subject the hydrated material to varying pressures, including both an increase in pressure over atmospheric and vacuum treatments. These I have found facilitate hydration and formation of the alpha lactose hydrate. To accomplish this, material collecting in the bottom of vessel 11 is removed by positive feeder 14 into pressure vessel 16, wherein a pressure of about 200 pounds per square inch is maintained. This vessel includes suitable means such as a screw conveyor 17 for transferring the material from adjacent end 18 of the vessel to the other end 19 thereof, while suitably agitating the material and breaking up any small lumps that might tend to form. Screw conveyor shaft 21 is preferably hollow and includes nozzles 22 which introduce air containing sufficient moisture to supply enough for complete hydration of the lactose anhydrides. The vessel 16 is maintained at a low temperature of about 0° C. This temperature and the high pressure elevated above atmospheric ensure moisture condensation on the particles of the product undergoing hydration.

The material is then transferred by positive feeder 22 into another pressure vessel 23 which contains a screw conveyor 24. The vessel 23 is also maintained under pressure by air admitted through nozzles 26. If all the moisture that is necessary to hydration has not been added, the admitted air can carry some if desired. In any event, by the time the material is transferred out of vessel 23 by positive feeder 25 into vessel 27, it should have been subjected for a time to the presence of sufficient moisture to completely hydrate the lactose anhydride content and should also have had sufficient time under pressure to hydrate the lactose anhydrides and a substantial proportion of the beta lactose hydrate present to the alpha form. Vessel 27 is maintained at a pressure much lower than that in vessel 23, usually a reduced pressure of about 10–15 inches of vacuum, a vacuum pump (not shown) being attached to outlet 28. Within vessel 27 the material is additionally agitated by screw conveyor 29 which conveys the material therein while agitating it to outlet 31 from which it is removed by positive feeder 32 to a fan 33.

The vessels 16, 23 and 27 are preferably maintained at a relatively low temperature, below 93.5° C., and preferably below room temperature and about 0° C. This is secured by circulating cold water about each of the vessels through passages 30 to absorb therefrom the heat of hydration which I have determined causes fermentation in the milk products and gives rise in part to the cheesy taste and odor and off color of the hydrated product. It is usually not necessary to cool vessel 8, since, as I have indicated before, the hydration of the lactose anhydrides goes slowly in the presence of protein. Hydration of the material does not occur to a substantial extent until after the material is out of the vessel 8.

Furthermore, material delivered to vessel 8 is preferably cold or precooled prior to contact with the water. Vessel 8 can be cooled if desired to maintain the temperature therein, although I have not found this necessary if the material delivered thereto is cold, at room temperature or as low as 0° C.

The essentials in the hydration step are the low temperature (below 93.5° C. and preferably below room temperature, 20° C. and usually about 0° C.), the presence of moisture and the agitation or substantially constant agitation of the material in the moisture containing atmosphere. The use of pressure merely increases vapor pressure effect of the water, and thus facilitates hydration. It is not an essential, and the hydration can be effected entirely at atmospheric pressure so long as the temperature is kept low and the material constantly agitated. The use of high pressure on vessels 16 and 23 is not a necessity as I have indicated.

By subjecting the material in vessel 27 to a partial vacuum, excess moisture, that is, moisture beyond that necessary to complete hydration of lactose anhydrides, is removed at a low temperature. This removal is further facilitated, if desired, by introducing dry air into fan 33 which is used to convey the now hydrated material to the sizing equipment indicated by cyclone chamber 34, screen 36 and collectors 37 and 38. The partial vacuum treatment can be omitted as appears hereinafter.

The air need only be dry. Since the easiest way to obtain this is to heat it, the air can be warm but it should not be so warm nor should the contact time be high enough to coagulate albumen and create a higher protein insoluble portion or to heat the material to 93.5 C. or above.

The material passed by the screen is ordinarily 98% finer than 300 mesh, a 10XX silk screen being used, any material coarser than this passing off into collector 38, while material of the fineness desired is taken in collector 37. The coarse material is returned to the fan through line 39, while the dust passes off as at 41 to be collected in a dust collector. The material recovered is free flowing, does not cake or ball even on long exposure to moisture, and its protein solubility is substantially that of the original material.

The rate of flow of the material through the equipment can be varied in accordance with the lactose content of the material being subjected to hydration to the end that sufficient time is allowed for substantially complete hydration and conversion of a preponderant quantity of lactose to the alpha lactose hydrate form.

The drying step disclosed is that preferred. However, vessel 27 need not be placed under vacuum, and no removal of the moisture need be effected therein. The excess moisture can be removed in any suitable manner so long as the temperature of the material is not raised to coagulate proteins or the material allowed to cake or to cause reversion of the lactose at 93.5° C. I can successfully pass the material containing excess moisture to mix with dry air in fan 33 without removing any in vessel 27. It is only necessary to remove a little of the moisture, 3-7%. This is easily accomplished because the material is so powdery. The temperature should not get above 93.5° C. in the material or else the alpha lactose will revert to beta lactose.

It is not necessary to dry the milk or milk product entirely for the product will be powdery if the moisture content is reduced to about 10% so that the product is powdery and not a paste. As I have indicated in Figure 2, if the dry powdered milk product is cooled to below 93.5° C., to about room temperature and preferably 0° C., and kept in such a state of agitation that the product does not collect into cake like masses, the stabilized product results. After a sufficient time, the cold product, now stabilized, has removed whatever little excess moisture is present. Usually about an hour suffices to effect stabilization. The stabilized product is treated to remove the excess moisture by any suitable method so long as the protein insoluble content is not increased or reversion to beta lactose effected, and the previously described methods can be used.

The desiccation of the milk can be by any suitable process. This is practiced to the extent required to give a powdery product, usually less than 20% moisture and preferably about 10%. The hot and only partially dry product is cooled and then agitated for about an hour after which it is finally dried without coagulating the protein or causing alpha lactose hydrate reversion to the beta form.

The product produced by my process contains the lactose present predominately in the alpha lactose form and is therefore stable, remaining free flowing and non-caking under conditions giving rise on prior art materials to solid products which were not free flowing.

The alpha lactose in the product is in a crystalline form, the product being gritty because of these crystals. This product, alpha lactose hydrate crystals, is difficult to dehydrate unless heated. When alpha lactose is amorphous it takes on water easily. Since all the lactose is present substantially as the alpha hydrate, my material is very stable.

It is to be remarked that my soluble material remains free flowing and that the prior art materials were never as low in insolubles nor free flowing even though they claim to be. This is true because I have determined that once the material has been allowed to settle and remain at rest in the presence of moisture for any length of time, the protein micellae is swollen beyond colloidal size. Thereafter, even if it is subdivided by grinding, the protein micellae are swollen to such an extent that the material is completely water insoluble. The colloidal jells formed in the practices of the prior art prevent a portion of the lactose from being completely hydrated, so even after the material has been subdivided it will subsequently cake again upon exposure to the atmosphere.

I claim:

1. A process for stabilizing a milk product material containing sufficient quantities of alpha and beta lactose anhydride as to be markedly hygroscopic comprising agitating said material substantially constantly in finely divided form in a moisture laden atmosphere at a temperature below 93.5° C. for a time sufficient to ensure hydration of said lactose, said atmosphere containing moisture more than sufficient to hydrate said lactose but insufficient to cause water to accumulate on particles of material, separating said material from said atmosphere in finely divided form, and removing any excess of moisture from said material while said material is in its finely divided form.

2. A process for stabilizing a finely divided milk product material containing sufficient quantities of alpha and beta lactose anhydride as to be markedly hygroscopic comprising continually agitating said material at a temperature below 93.5° C. while supplying moisture to said material during substantially the entire period of said agitation, said moisture being supplied at a rate sufficient to ensure hydration of said anhydride but insufficient to result in local over concentration resulting in swelling of protein micellae, and separating said material from any final moisture excess.

3. A process for producing crystalline alpha lactose in a finely divided material containing alpha and beta lactose anhydrides as to be markedly hygroscopic comprising agitating said material constantly in the presence of moisture substantially only sufficient to hydrate said anhydrides while removing from said material the heat of hydration of said anhydrides to produce in said material crystalline alpha lactose hydrate.

4. A process for producing crystalline alpha lactose in a finely divided material containing alpha and beta lactose anhydrides as to be markedly hygroscopic comprising agitating said material constantly in the presence of moisture substantially only sufficient to hydrate said anhydrides while removing from said material heat of hydration of said anhydrides to produce in said material crystalline alpha lactose hydrate while maintaining said material at a temperature below 93.5° C. to force conversion of lactose from the beta to the alpha form and increase the alpha lactose content of said material.

5. A process for producing a stable finely divided material from an aqueous mass containing substantial quantities of alpha and beta lactose anhydrides as to be markedly hygroscopic in the presence of proteins, said process comprising dehydrating said mass to reduce the water content thereof to about 10% and form a finely divided solid material, cooling said finely divided solid material to below 93.5° C., maintaining said cooled solid material in a substantially constant state of agitation while cooling to maintain said temperature and removing any free moisture while said material is finely divided.

6. In a process of stabilizing a material containing quantities of alpha and beta lactose anhydrides as to be markedly hygroscopic as well as proteins, the steps of maintaining said material dispersed in finely divided form in the presence of available moisture more than sufficient to hydrate said anhydrides and of the order of 10% by weight of said material while maintaining said material at a temperature of about 0° C. until hydration is substantially complete.

7. A process for producing a dry stable milk product from a source material containing sufficient alpha and beta lactose anhydrides as to render said material markedly hygroscopic, said process comprising dehydrating said source material to remove therefrom all but about 10% of the water therein and the partially dehydrated material is powdery, agitating said partially dehydrated material at a temperature below 93.5° C. for a time sufficient to hydrate any hygroscopic components in said material and to stabilize said partially dehydrated material, and finally removing substantially any moisture in excess of that present as water of hydration of constituents of said stabilized material.

FAW YAP CHUCK.